H. T. NOBLE.
Plow-Clevis.
No. 201,120. Patented March 12, 1878.
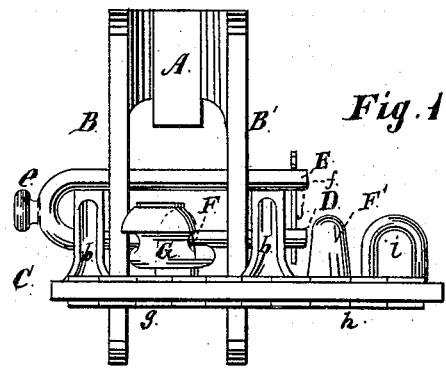
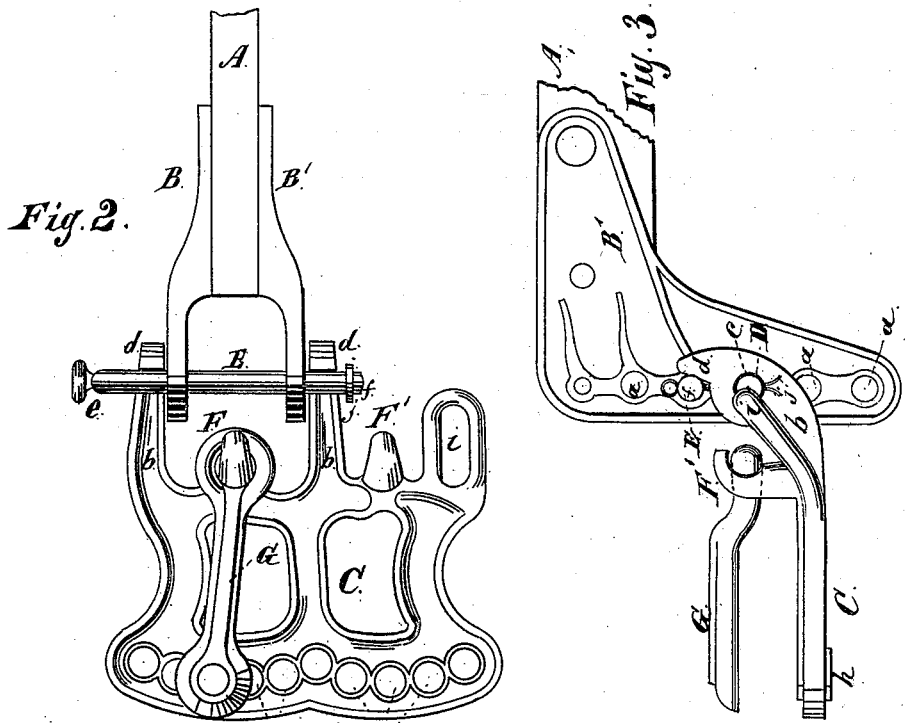
Witnesses:
Heinr. F. Bruns
O. W. Bond
Inventor:
Henry T Noble
By West & Bond
attys

UNITED STATES PATENT OFFICE.

HENRY T. NOBLE, OF DIXON, ILLINOIS.

IMPROVEMENT IN PLOW-CLEVISES.

Specification forming part of Letters Patent No. 201,120, dated March 12, 1878; application filed November 26, 1877.

*To all whom it may concern:*

Be it known that I, HENRY T. NOBLE, of Dixon, Lee county, State of Illinois, have invented new and useful Improvements in Plow-Clevises, of which the following is a full description, reference being had to the accompanying drawing, in which—

Figure 1 is a front elevation; Fig. 2, a plan view; Fig. 3, a side elevation.

This invention relates to clevises which are adapted to support an evener.

It consists in devices by means of which the clevis is prevented from falling below a horizontal position, but has a limited vibration upward; in providing the clevis with a strap, the forward end of which receives and holds the bolt which connects the evener with the clevis, and in so constructing the clevis that the said strap can be used with either one of the two or more series of holes in the front edge of the clevis.

In the drawings, A represents the plow-beam. B B' are the beam-plates, securely bolted to the forward end of the beam A. Each beam-plate is provided with a series of holes, a, at equal distances from each other. C is the clevis. It has two projections or limbs, b, extending to the rearward, each of which is provided with a hole, c. The end of each projection b is turned upward, so as to form a hook, d. D E are two pins. As represented, they are connected together at one end, e, forming a double pin, fitting any two of the adjoining holes in the plates B. F F' are two prongs or hooks standing up from the rear edge of the clevis C. G is a strap, one end of which is adapted to hook onto either of the prongs F F'. g h are two series of holes in the front edge of the clevis, each series being in the arc of a different circle, the center of the circle being at F F'. The strap G has a hole in its forward end, and this hole can be brought over either one of the holes g when the strap G is hooked upon F; and if hooked upon F', then its forward end can be brought over either one of the holes h. The clevis is pivoted to the beam-plates by the pin D, and the parts are so arranged that the hook d will come in contact with the end f of the pin E, which projects outside of the beam-plate, preventing the clevis from falling below a horizontal position, while it can vibrate upward to a limited extent upon the pin D. i is an eye to receive one end of a draft-rod.

The strap G will be found a desirable feature, as it receives and holds the upper end of the bolt by means of which the evener is connected with the clevis. The evener can be connected with the clevis at any one of the holes g or h, and the strap can be easily moved from the hook F to the hook F'. It is evident that the strap can be connected at its inner end with the clevis by means of a bolt; but the hook will be found more convenient.

I do not limit myself to connecting the strap with the clevis in the manner shown. Its inner end might be connected with the pin D; but there would be some objection to this.

I use a key, j, to hold the pins D E in place. Two separate pins might be used instead of the double pin D E represented.

I have shown only two series of holes in the front edge of the clevis. It might be provided with a third series.

What I claim as new, and desire to secure by Letters Patent, is—

1. The clevis C, provided with the curved projections b and hooks d, in combination with the beam-plates B B', having a single row of vertical holes, a, and the pins D E, adjustable in such single row of holes, substantially as described.

2. The clevis C, having the circular series of holes g and h, in combination with the hooked studs F F' and the interchangeable strap G, substantially as and for the purpose specified.

HENRY T. NOBLE.

Witnesses:
A. C. WARNER,
JOHN V. THOMAS,
C. H. NOBLE.